(12) United States Patent
Childs (10) Patent No.: US 8,576,286 B1
(45) Date of Patent: Nov. 5, 2013

(54) DISPLAY SYSTEM (75) Inventor: John Childs, Shelburne, VT (US)

(73) Assignee: General Dynamics Armament and Technical Products, Inc., Charlotte, NC (US)

(*) Notice: Subject to any disclaimer, the term of this patent is extended or adjusted under 35 U.S.C. 154(b) by 289 days.

(21) Appl. No.: 13/085,233

(22) Filed: Apr. 12, 2011

Related U.S. Application Data (60) Provisional application No. 61/323,749, filed on Apr. 13, 2010.

(51) Int. Cl.
H04N 13/00 (2006.01)

(52) U.S. Cl.
USPC ............ 348/148; 348/36; 348/39; 348/113; 348/118; 348/218.1; 382/104

(58) Field of Classification Search
USPC ........................................................ 345/158
See application file for complete search history.

(56) References Cited

U.S. PATENT DOCUMENTS

| | | | | |
|---|---|---|---|---|
| 5,037,166 A * | 8/1991 | Malcolm et al. | ................ | 359/15 |
| 7,436,429 B2 * | 10/2008 | Tillotson | ......................... | 348/36 |
| 8,139,109 B2 * | 3/2012 | Schmiedel et al. | ........... | 348/118 |
| 2001/0043266 A1 * | 11/2001 | Robinson et al. | ............... | 348/53 |
| 2005/0086000 A1 * | 4/2005 | Tsuchiya et al. | ............... | 701/211 |
| 2007/0247522 A1 * | 10/2007 | Holliman | ........................ | 348/46 |
| 2008/0180527 A1 * | 7/2008 | Nixdorf et al. | ................ | 348/148 |
| 2008/0212215 A1 * | 9/2008 | Schofield et al. | ............ | 359/844 |
| 2008/0258063 A1 * | 10/2008 | Rapanotti | ..................... | 250/334 |
| 2008/0278821 A1 * | 11/2008 | Rieger | .......................... | 359/630 |

* cited by examiner

Primary Examiner — Quan-Zhen Wang
Assistant Examiner — David Lee
(74) Attorney, Agent, or Firm — Hunton & Williams LLP (57) ABSTRACT A system and method for video navigation is disclosed. The system and method may include one or more video cameras configured to capture views external to the vehicle, a control mechanism for adjusting the sight-line of the one or more video cameras, and a display panel positioned within the vehicle for displaying the views captured within the sight-line of the one or more video cameras.

30 Claims, 11 Drawing Sheets

DISPLAY SYSTEM

CROSS REFERENCE TO RELATED APPLICATIONS

This application claims the benefit of priority under 35 U.S.C. §119(e) of U.S. Provisional Application Ser. No. 61/323,749, filed Apr. 13, 2010, the context of which is relied upon and incorporated herein by reference in its entirety.

TECHNICAL FIELD

The present embodiments relate generally to navigation features and, more particularly, to a vehicle having navigation features that enables an occupant to view external surroundings on a three-dimensional ("3D") display.

BACKGROUND

Today's armored vehicles are frequently manufactured with transparent armor—ballistic (bulletproof) glass windows and/or windshields. These structures typically consist of a block or pane of glass or, if not glass, a composite layered structure consisting of special tempered glass laminated with different types of plastics mounted in an appropriately dimensioned frame that overlaps or fits into an opening in the body of an armored vehicle. Though these ballistic windows or windshields provide some amount of threat protection to the vehicle's occupants, they are unwieldy and frequently damaged. Whether it is from a high-velocity projectile or a rock even, these ballistic windshields and/or windows frequently crack, or fail in other ways, which invariably leads to visual distortions and obstructions, and to expensive and time-consuming repairs. These and other problems exist with conventional ballistic glass windows and/or windshields.

Some conventional vehicles utilize video cameras to assist in navigation. However, these conventional deployments of cameras as navigation tools are in a secondary role (e.g., a back-up camera), and are not intended to serve as the primary or sole navigation system of vehicle. Moreover, these conventional navigation systems are limited to two-dimension displays. This inhibits the depth perception of the operator, leading to less-efficient, dangerous, or ineffective use of the vehicle while using such secondary navigation systems.

Notwithstanding the number of navigation systems currently in existence, there exists a need for a camera-based navigation system capable of serving as the primary navigation system for a vehicle.

SUMMARY OF THE INVENTION

The present disclosure provides a number of exemplary embodiments that may be used collectively, in various combinations, or alone. The following summary provides examples of such inventions, and does not limit the invention as claimed in any way.

In one exemplary embodiment, a navigation system for a vehicle is provided. The navigation system comprises one or more video cameras configured to capture views external to the vehicle, a control mechanism for adjusting the sight-line of the one or more video cameras, and a display for displaying the views captured within the sight-line of the one or more video cameras.

In another exemplary embodiment, a navigations system for a vehicle is provided having one or more stereoscopic video cameras and a display that is configured to display three-dimensional images to an occupant of the vehicle.

In yet another exemplary embodiment, a method for providing video navigation for a vehicle is provided. The method involves the steps of receiving a user-input to articulate one or more video cameras, adjusting the sight-line of the one or more video cameras based on the received user input, capturing video images from the one or more video cameras and displaying the video images on a display internal to the vehicle.

Other uses and variations of the foregoing will be apparent to one of ordinary skill in the art.

BRIEF DESCRIPTION OF THE DRAWINGS

The embodiments set forth in the drawings are illustrative and exemplary in nature and not intended to limit the subject matter defined by the claims.

The invention, both as to its structure and operation together with the additional objects and advantages thereof are best understood through the following description of exemplary embodiments of the present invention when read in conjunction with the accompanying drawings, wherein like structure is indicated with like reference numerals and in which.

DESCRIPTION

The following description conveys an understanding of embodiments that relate generally to vehicles, such as armored vehicles, and more particularly to vehicles having navigation features that may eliminate the need for one or more ballistic window panes. Numerous exemplary embodiments of vehicles having navigation features are described below. Armored vehicles, and other wheeled and non-wheeled vehicles, described by the exemplary embodiments with these navigation features are not limited to only those embodiments, however. For example, exemplary embodiments may be used for any vehicle or other machine or device, including non-military vehicles, machines, or devices.

The exemplary embodiments may be sized or shaped differently, in any suitable manner, and may be adapted to add components not described, or to remove components. One possessing ordinary skill in the art will appreciate the exemplary embodiments' use for purposes and benefits in alternative forms and industries, depending upon specific design needs and other considerations.

Terminology used in this description is for describing particular embodiments only and is not intended to limit the scope of an exemplary embodiment. As used throughout this disclosure, the singular forms "a," "an," and "the" include the plural, unless the context clearly dictates otherwise. Thus, for example, a reference to "a panel" may encompass a plurality of panels, or other equivalents or variations known to those skilled in the art. Furthermore, permissive language (e.g., "may") is used for describing some embodiments or features, such use does not suggest that embodiments or features described using other language (e.g., "is," "are") are required. Unless defined otherwise, all terms have the same commonly understood meaning that one of ordinary skill in the art to which this invention belongs would expect them to have.

With regard to the exemplary embodiments of the navigation features, any part that fastens, inserts, attaches, or connects any component to or from another feature or vehicle is not limited to any particular type and is instead intended to encompass all known. Unless otherwise specifically disclosed, materials for making components of the present invention may be selected from appropriate materials, such as metal, metal alloys, ballistic metals, ballistic metal alloys, natural or manmade fibers, composites, vinyl, plastics, silicone, rubber, and so on. Any and all appropriate manufacturing or production methods, such as casting, pressing, extruding, molding, machining, may be used to construct the exemplary embodiments or their components.

When describing exemplary embodiments, any reference to relative position (front and back or rear, top and bottom, right and left, upper and lower, and so on) is intended to conveniently describe those embodiments only. Positional and spacial references do not limit the exemplary embodiments or its components to any specific position or orientation.

The present embodiments disclosed herein are generally designed to provide navigation features for a vehicle, such as an armored vehicle. These features may provide a way for a vehicle occupant to navigate a vehicle without the need for a transparent windshield or other windows. These features may, however, be used in conjunction with a transparent windshield or other windows.

Figure 1:
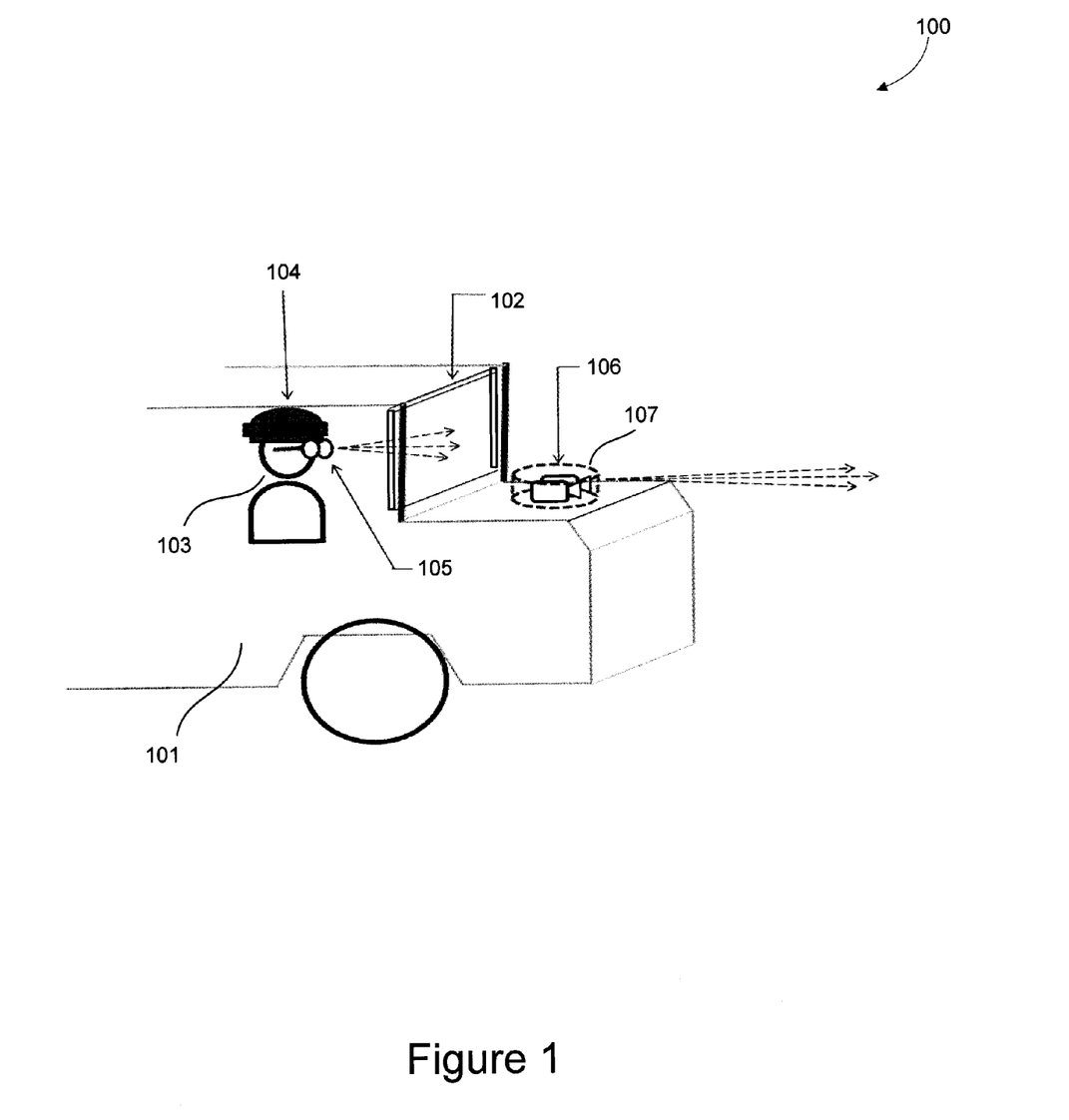
FIG. 1 depicts an exemplary navigation system for a vehicle.
Figure 5:
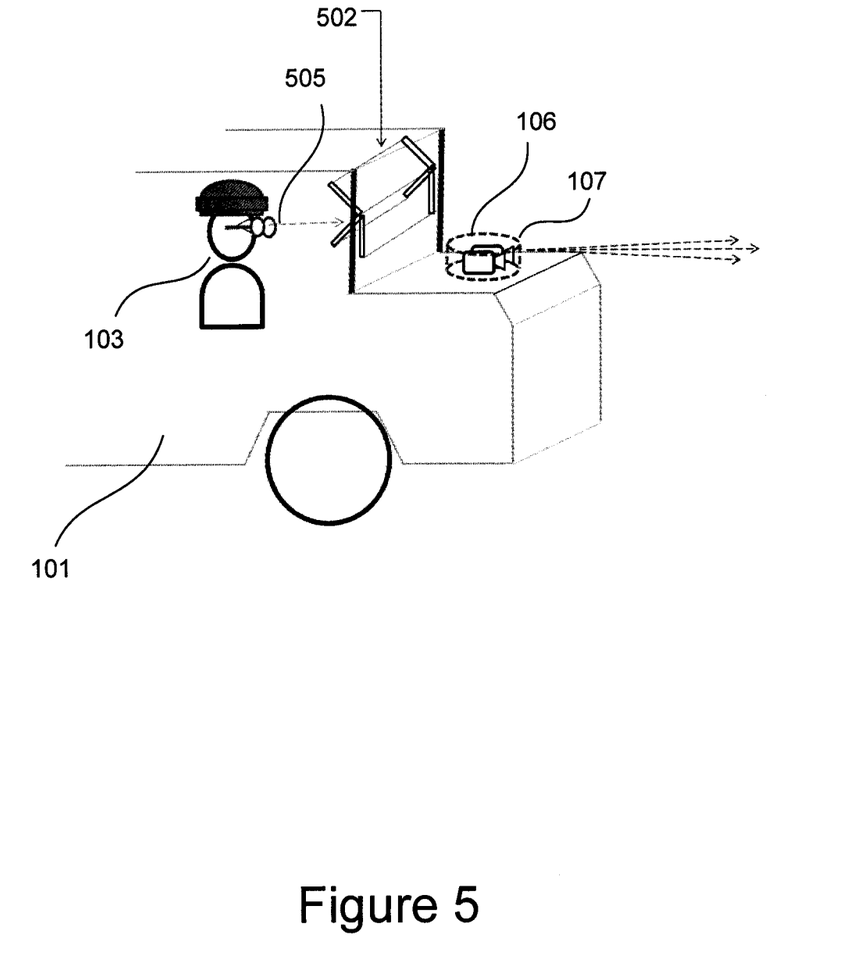
FIG. 5 depicts an exemplary navigation system for a vehicle having a stereo monitor three-dimensional display.

As shown in FIG. 1, an exemplary embodiment of navigation features for use in a vehicle 101 is shown. These features may collectively and generally be referred to as a video system 100. In this exemplary embodiment, a vehicle 101 may be equipped with one or more display panels 102 and one or more cameras 106 mounted to or on a vehicle. The one or more display panels 102 may be designed to replace in whole or part a transparent windshield normally associated with a vehicle. The one or more display panels 102 may be substantially flat, though they need not be substantially flat, and may comprise a video monitor, such as a 120 Hz 3D monitor such as the Samsung type 2233RZ or a pair of monitors coupled with a mirror such as the PLANAR SD2620W StereoMirror® video monitor. As depicted in FIG. 5, a stereo monitor 3d video display 502 may be utilized to provide three-dimensional imaging to the occupant 103. In the exemplary embodiment depicted in FIG. 5, glasses may not be required to create three-dimensional imaging and the stereo monitor alone creates a three-dimensional effect. On the other hand, as depicted in FIG. 1, a conventional display panel, such as display panel 102 may also provide three-dimensional imaging when an occupant, such as occupant 103, views the display panel through 3D glasses. Those with skill in the art will readily understand that one or more cameras 106, display panel 102, and glasses 105 may be configured to utilize stereoscopic imaging to create a three-dimensional viewing effect for occupant 103. Of course, other three-dimensional imaging techniques may also be utilized, including autostereoscopic, computer-generated holography, and volumetric displays.

The one or more cameras 106 may be designed to zoom in and out on images, either through optical or software zoom capabilities, as needed to afford the vehicle's occupants with views ranging from extremely wide angles to telescopic. Furthermore, the one or more displays may be configured and designed to project a holographic display. It should be appreciated that any number of camera configurations may be utilized in accordance with the present navigation system for a vehicle.

In an exemplary embodiment the one or more display panels 102 may be presented to the vehicle's occupant 103 directly. That is, the one or more display panels 102 may be positioned where a typical windshield may be located in a vehicle. Alternatively, in another exemplary embodiment, the one or more display panels 102 may be located on or within the dashboard, with the option of being optically projected to the operator 103 through a reflective device, such as a mirror.

Figure 2:
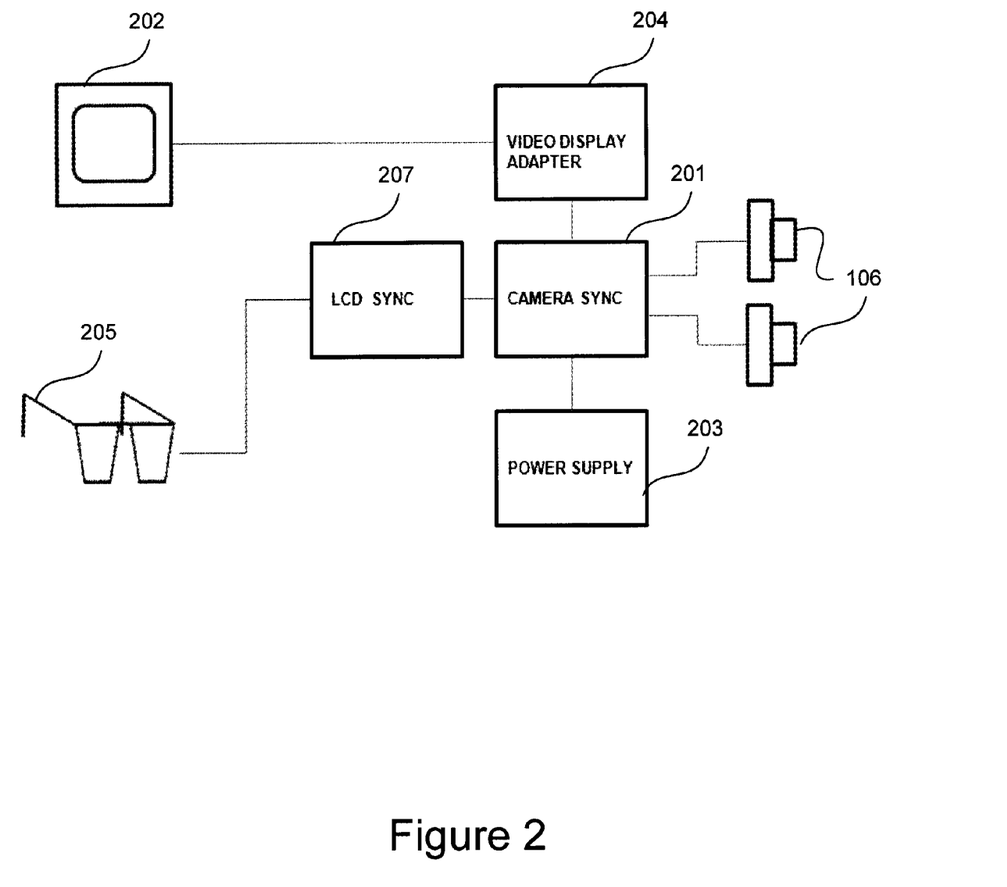
FIG. 2 depicts a block diagram of an exemplary video camera and display system for use in a navigation system.

One or more cameras 106 may be mounted to or formed integrally within the vehicle 101. In an exemplary embodiment, the one or more cameras 106 may be stereoscopic video cameras. With reference to FIG. 2, the one or more cameras 206 (e.g., one or more cameras 106) may communicate with a camera-sync module 201 for processing the images and information captured and sent by the one or more cameras 106. The camera sync module 201 may further be connected to a video-display adapter module 204 and/or a LCD-sync module 207. The video-display adapter module 204 may receive, further process, and send information to the one or more display panels 202 that are located within a vehicle, such as vehicle 101. In an exemplary embodiment, the LCD-sync module 207 may receive, further process, and send information to a viewing apparatus 205, such as shutter or polarized glasses, worn by the vehicle's occupant. In an exemplary embodiment, shutter glasses may be used in conjunction with a display screen, such as display screen 102, to create the illusion of a three dimensional image. It should be understood that the navigation features of the present embodiments may use either a video-display adapter module 204 or a LCD-sync module 207, or both.

Figure 2A:
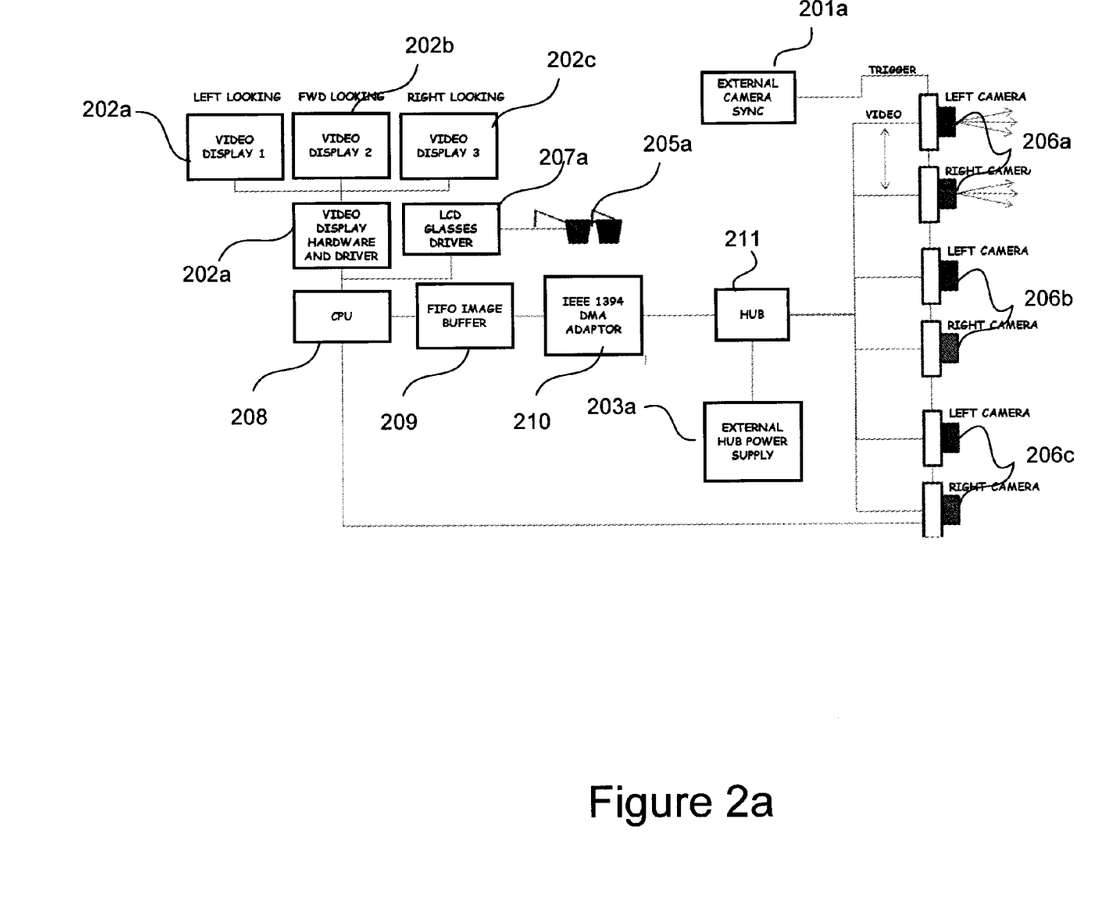
FIG. 2a depicts a block diagram of an exemplary video camera display system for use in a navigation system.

FIG. 2a depicts a block diagram of an exemplary video camera display system for use in a navigation system. One or more sets of cameras, such as 206a, 206b, and 206c may be mounted or formed integrally to vehicle 101. As described above, the one or more sets of cameras 206a, 206b, and 206c may be stereoscopic cameras located at the front of the vehicle 101 in order to provide a 180 degree field of view toward the front of the vehicle. In an exemplary embodiment, the one or more sets of cameras 206a, 206b, and 206c may communicate with an external camera sync 201a for ensuring that the sequential frames transmitted from the sets of cameras 206a, 206b, and 206c may be captured at the appropriate times and frequencies. The sets of cameras 206a, 206b, and 206c may be in communication with a hub 211 for managing the flow of video frames the sets of cameras 206a, 206b, and 206c on their respective video feed cable (or frequency range on the same cable). In an exemplary embodiment, the hub 211 may collect asynchronous data from the sets of cameras 206a, 206b, and 206c before gating it to a synchronized bus. For instance, the video frames may be gated to communication bus 210 for facilitating the communication of the video frames through the various components of the system. Video feeds may be converted from a "raw" communication bus (e.g., IEEE 1394) to a communication bus configured to use a direct memory access (DMA) adaptor. The feeds may then be buffered by image buffer 209. In an exemplary embodiment, the image buffer 209 may comprise a First-In-First-Out (FIFO) buffering circuit to prevent dropped frames in the event that the bus is temporarily unavailable. The image buffer 209 may operate to ensure an uninterrupted flow of image data packets in the event of occasional bus unavailability. A central processing unit 208 may be utilized to provide a wide variety of image processing services to convert the video frames captured by the sets of cameras 206a, 206b, and 206c into a format suitable for creating stereo renderings for display. Of course, in other exemplary embodiments, the sets of cameras 206a, 206b, and/or 206c may also include a processor for converting the captured images into signals suitable for a stereoscopic display. By way of an exemplary embodiment, the central processing unit 208 may convert the frames captured by the sets of cameras 206a, 206b, and/or 206c by constructing frame buffers using a red/blue anaglyph, line interlacing, or page alternating rendering based on left and right video feeds. The central processing unit 208 may be responsible for presenting the processed video data to one or more video-display modules 202a for receiving and further processing before sending information to one or more display panels, such as display panels 202a, 202b, and/or 202c, which may be located within a vehicle, such as vehicle 101.

The central processing unit may also provide additional image processing algorithms and may facilitate operator feedback control of the one or more sets of cameras 206a, 206b, and/or 206c. In an exemplary embodiment, an LCD glasses driver 207a may be configured to receive, further process, and send display signals to an alternative viewing apparatus, such as liquid display shutter glasses 205a worn by the vehicles occupant. In an exemplary embodiment, the liquid display shutter glasses 205a may be used as an alternative to display screens 202a, 202b, and/or 202c. In other exemplary embodiments, appropriate signals may be sent to liquid display shutter glasses 205a and video displays 202a, 202b, and/or 202c to display a wide variety of images to the vehicles occupant. Those with skill in the art will readily appreciate that any number of configurations may be utilized to provide the vehicle's occupant with any numbers of desired images.

Figure 2B:
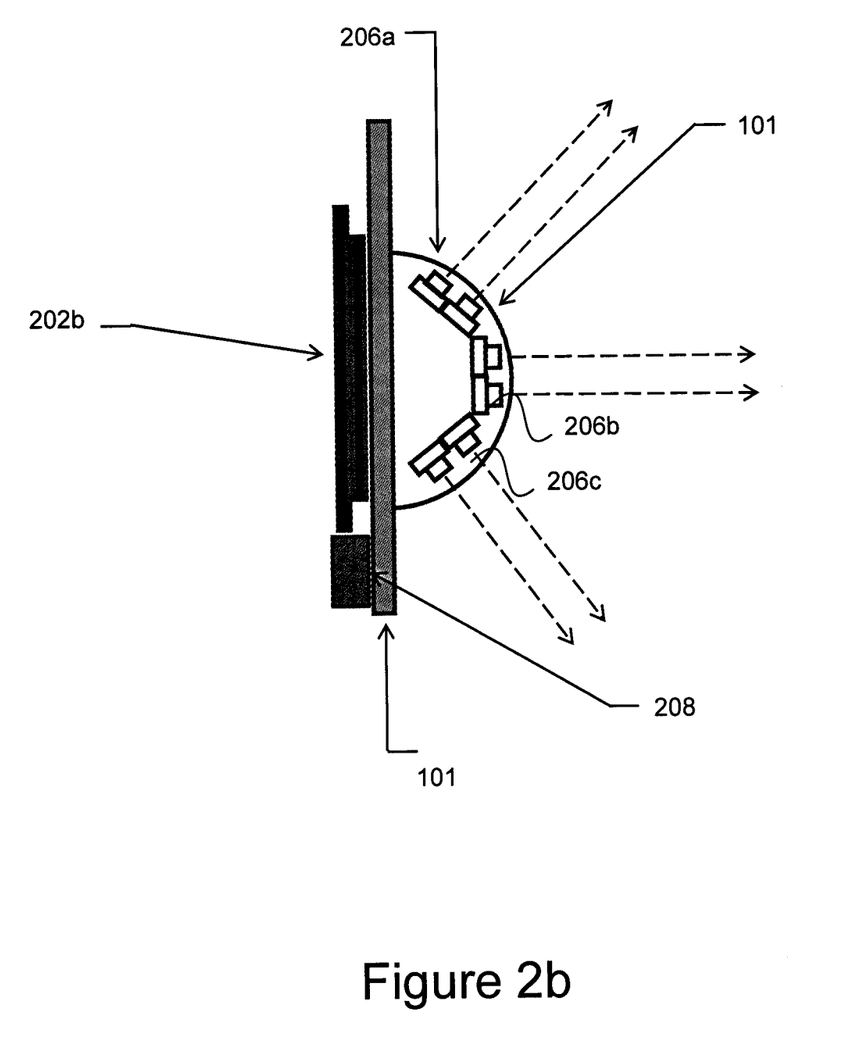
FIG. 2b depicts an exemplary configuration of sets of cameras for use in a navigation system.

FIG. 2b depicts an exemplary configuration for sets of cameras 206a, 206b, and/or 206c, housed either within, or externally to vehicle 101. In the exemplary embodiment depicted in FIG. 2b, set of cameras 206a may be focused towards a left direction, set of cameras 206b may be focused towards a forward direction, and set of cameras 206c may be focused toward a right direction. A central processing unit 208 may work to provide a variety of image processing services as discussed above, to facilitate the display of the images captured by the one or more sets of cameras 206a, 206b, and/or 206c on the appropriate display. In an exemplary embodiment, the images captured by the one or more sets of cameras 206a, 206b, and/or 206c may be displayed on an appropriate portion of a display panel, such as display panel 202b. In another exemplary embodiment, additional display panels may be positioned coincidental to the gaze of the one or more sets of cameras 206a, 206b, and/or 206c. For example and as discussed above, video displays 202a, 202b, and/or 202c may each correspond to a respective one or more sets of cameras 206a, 206b, and/or 206c.

Referring back to FIG. 1, the one or more cameras 106 may be articulating cameras. The one or more cameras 106 may contain elements sensitive to the visible spectrum, infrared (IR) wavelengths, or other non-visible wavelengths, and may contain elements like thermal image sensors. In an exemplary embodiment, the one or more cameras 106 may be mounted outside of the vehicle 101, within an enclosure 107, such as cupolas or turrets. The enclosure 107 may comprise armor in order to protect the one or more cameras 106 from damage. In another exemplary embodiment the enclosure 107 may provide articulating movement based on various inputs received from the navigation system 100. The enclosure 107 may also be camouflaged to mask the location of the one or more cameras 106. In other embodiments, the one or more cameras 106 may be miniaturized and may be integrated into the structure or the armor of a vehicle 101 itself. In still another embodiment, the one or more cameras 106 may be mounted inside the vehicle 101, configured and adapted with fiber optic lenses or other miniaturized and protected optical systems to capture and display external views within the vehicle.

Figure 3:
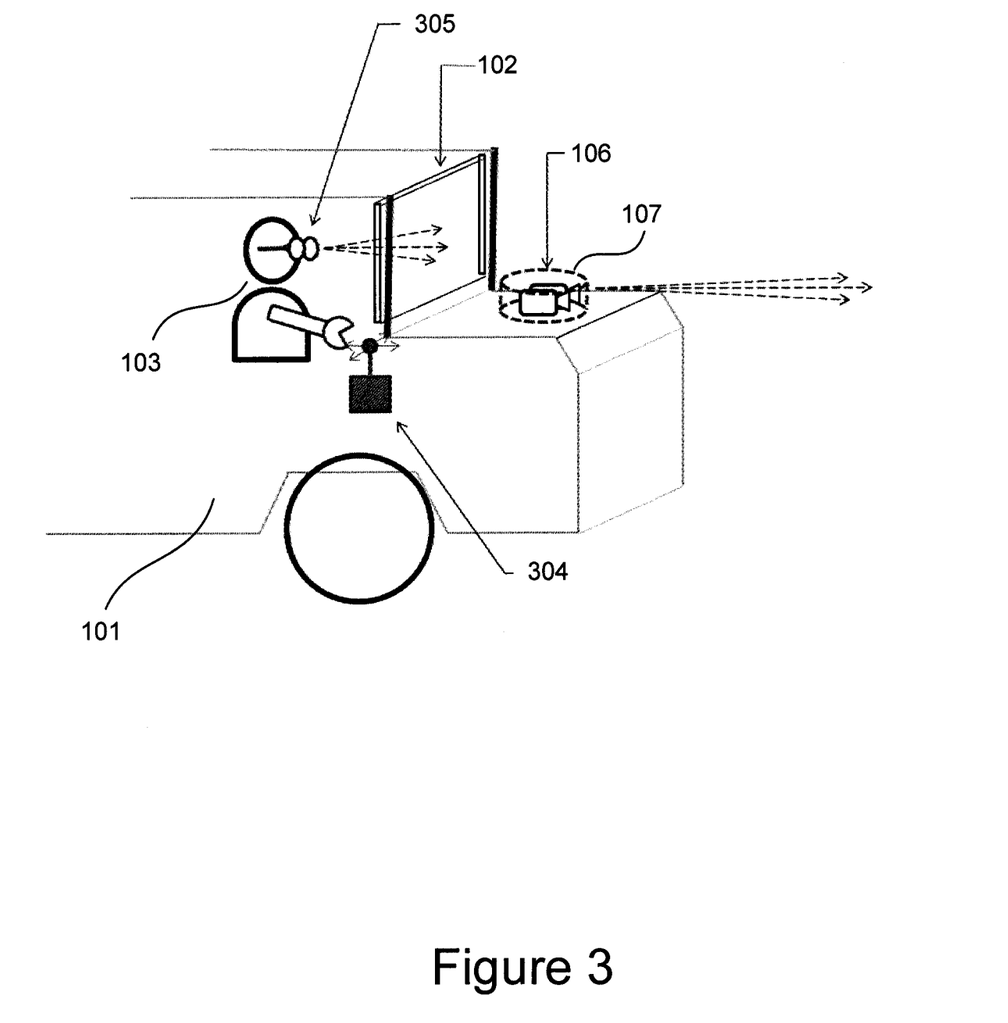
FIG. 3 depicts an exemplary navigation system for a vehicle having a control mechanism.

In an exemplary embodiment, the articulation of one or more cameras 106 may be controlled by the vehicle's occupant 103. For example, the occupant 103 may wear a sensor-fitted helmet 103 synced to the one or more cameras 106. In this exemplary embodiment, the external view displayed within the vehicle may be coincidental with the of the occupant's gaze. As shown in FIG. 3, the one or more cameras 106 may be operated via a control mechanism 304 inside the vehicle, such as a joystick. In other exemplary embodiments, other sensors (not shown) may be positioned within the inside of the vehicle to sense the position of the eyes of occupant 103. Such sensors may then adjust the line of sight of one or more cameras 106 to be coincidental to the gaze of occupant 103. In another exemplary embodiment, the occupant 103 may wear sensor-fitted glasses (not shown) synced to the one or more cameras 106. In this exemplary embodiment, the views displayed within the vehicle may again be coincidental with the occupant's gaze. Those with skill in the art will readily understand that there are numerous other configurations that may be employed to provide the occupant 103 with control over the articulation of one or more cameras 106. Of course, in other exemplary embodiments, the one or more cameras 106 may be configured to detect movement and/or heat and to automatically articulate to capture images related to the detected movement and/or heat. It should be appreciated that the one or more cameras 106 may be static, controlled by occupant input, or automatically articulating based on pre-programmed instructions.

Figure 4:
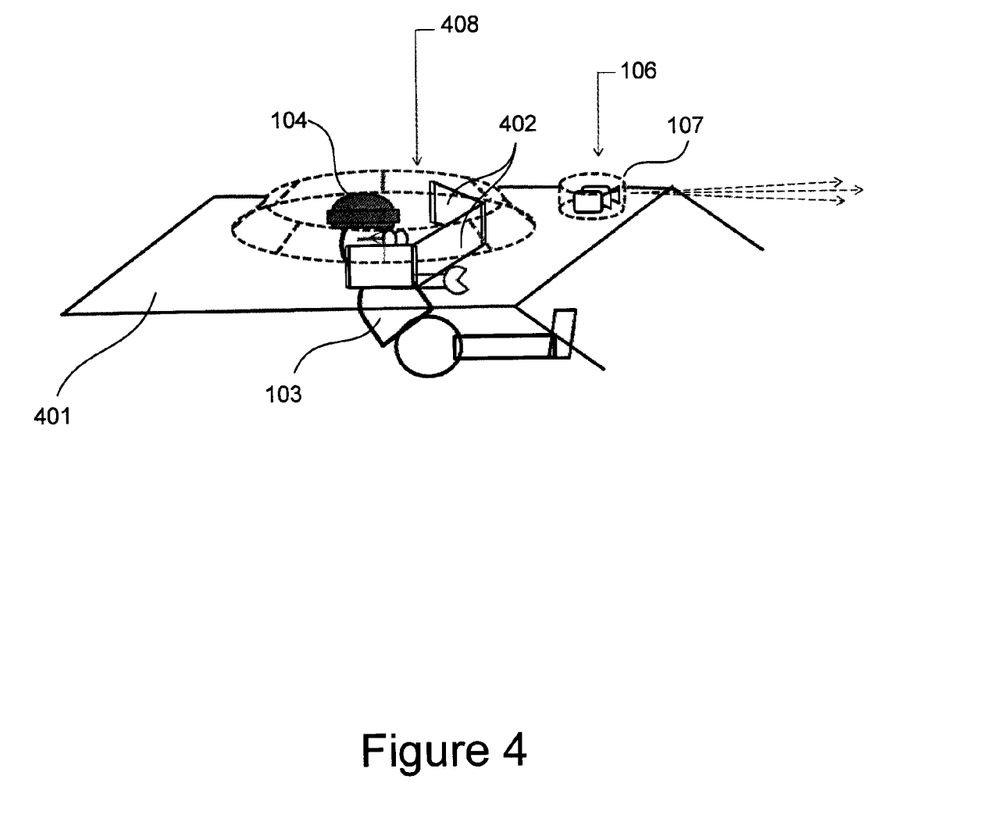
FIG. 4 depicts an exemplary navigation system for a vehicle having a multi-panel display.

FIG. 4 depicts an exemplary embodiment of a vehicle navigation system having a multi-panel display. The occupant 103 may control the articulation of the one or more cameras 106 according to the various configurations described above with regard to FIGS. 1 and 3. In an exemplary embodiment, the external view displayed within the vehicle 401 may be coincidental with the gaze of occupant 401. For example, the multi-panel display 402 may be configured to comprise three panels—left, middle and right. When the occupant 103 gazes forward, the one or more cameras 106 may capture images in front of the vehicle 401. The images captured by the one or more cameras 106 may be displayed on the middle panel of multi-panel display 402. When the occupant 403 gazes, for example, to the right, the one or more cameras 106 may also articulate to the right, thereby capturing images from the right side of vehicle 401. These images may then be displayed on the right panel of multi-panel display 402. Of course, when occupant 403 gazes to the left, the one or more cameras 106 may in turn articulate to the left, and capture images to the left of vehicle 401. These images may be displayed on the left panel of multi-panel display 402.

It should be understood that the foregoing example is exemplary only and not intended to be limited to a multi-panel display having only a left, right, and middle panel. In another exemplary embodiment, the multi-panel display 402 may comprise one or more curved panels that wrap around a portion of the interior 408 of the vehicle 401. It should be understood that multi-panel display 402 may be configured in any number of ways. For example, multi-panel display 402 may wrap around the entirety of an interior portion 408 of vehicle 103, thereby creating 360 degrees of panel coverage along the "x-axis" from the perspective of occupant 103. In another exemplary embodiment, the panels may also extend along the "y-axis," such that display panels are located at the top, bottom, and corners of the interior 408 of vehicle 401. It should be appreciated that references to "x-axis," "y-axis," "top," "bottom," and "corners" are for illustrative purposes only and are not intended to limit the position of one or more display panels within the vehicle 401. Those with skill in the art will readily understand that any number of panels may be utilized in any number of configurations, as desired, within the interior 408 of vehicle 401.

In another exemplary embodiment, the one or more cameras 406 may be static. For example, the one or more cameras 406 may comprise multiple static cameras that are continuously directed towards the front, rear, and sides of vehicle 401. In this exemplary embodiment, the images captured by each cameras (or each pair of cameras) may be displayed on four, corresponding panels (front, rear, and sides) within the interior 408 of vehicle 401. If the interior 408 of vehicle 401 has only one display, the navigation system may provide a selection mechanism for selecting the direction (front, read, and sides) that would like to have displayed on the display. In another exemplary embodiment, the image displayed on the display panel may be automatically selected based upon the direction of the vehicle. Those with skill in the art will readily understand that any number of cameras may be utilized in conjunction with any number of display panels.

FIG. 5 depicts an exemplary navigation system for a vehicle having a stereo monitor three-dimensional display. The stereo monitor three-dimensional display 502 may be configured to display images captured by the one or more cameras 106 in three dimensions without the use of conventional three-dimensional glasses. Those with skill in the art will readily understand that various types of three-dimensional displays may be deployed within the navigation system depending upon the desired configurations.

Figure 6:
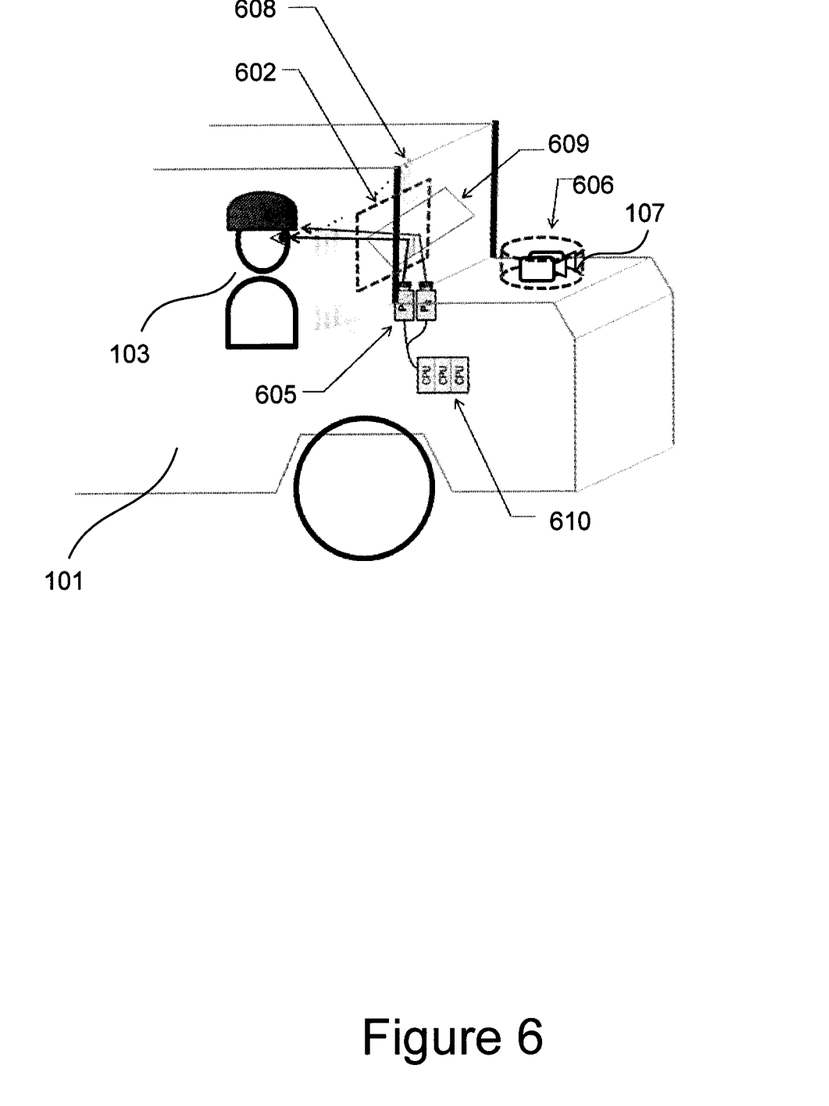
FIG. 6 depicts an exemplary navigation system for a vehicle having a holographic display.

FIG. 6 depicts an exemplary navigation system for a vehicle having a holographic display. In accordance with an exemplary embodiment, the navigation system may comprise one or more cameras 606, one or more projectors 605, holographic computational engine 610, mirror 609, and holographic display screen 602. The one or more cameras 606 may be stereo video cameras for capturing video and passing a series of images to the holographic computational engine 610. The holographic computational engine 610 may be configured to process the video received from the one or more cameras 606 before passing display signals to the one or more projectors 605. In one exemplary embodiment, the one or more projectors 605 may comprise twin LCD projector, but those with skill in the art will readily understand that any type of projector may be used to generate a holographic display.

Still referring to FIG. 6, the one or more projectors 605 may project a holographic image onto holographic display screen 602 (for example a Physical Optics Corporation—HDS holographic display). A curved viewing zone 608 may be positioned proximate to the holographic display screen 602 to create a holographic visual effect for the occupant 103. According to this exemplary embodiment, the occupant 103 does not need to wear three-dimensional glasses to view the image captured by one or more cameras 606 in three-dimensions.

Figure 7:
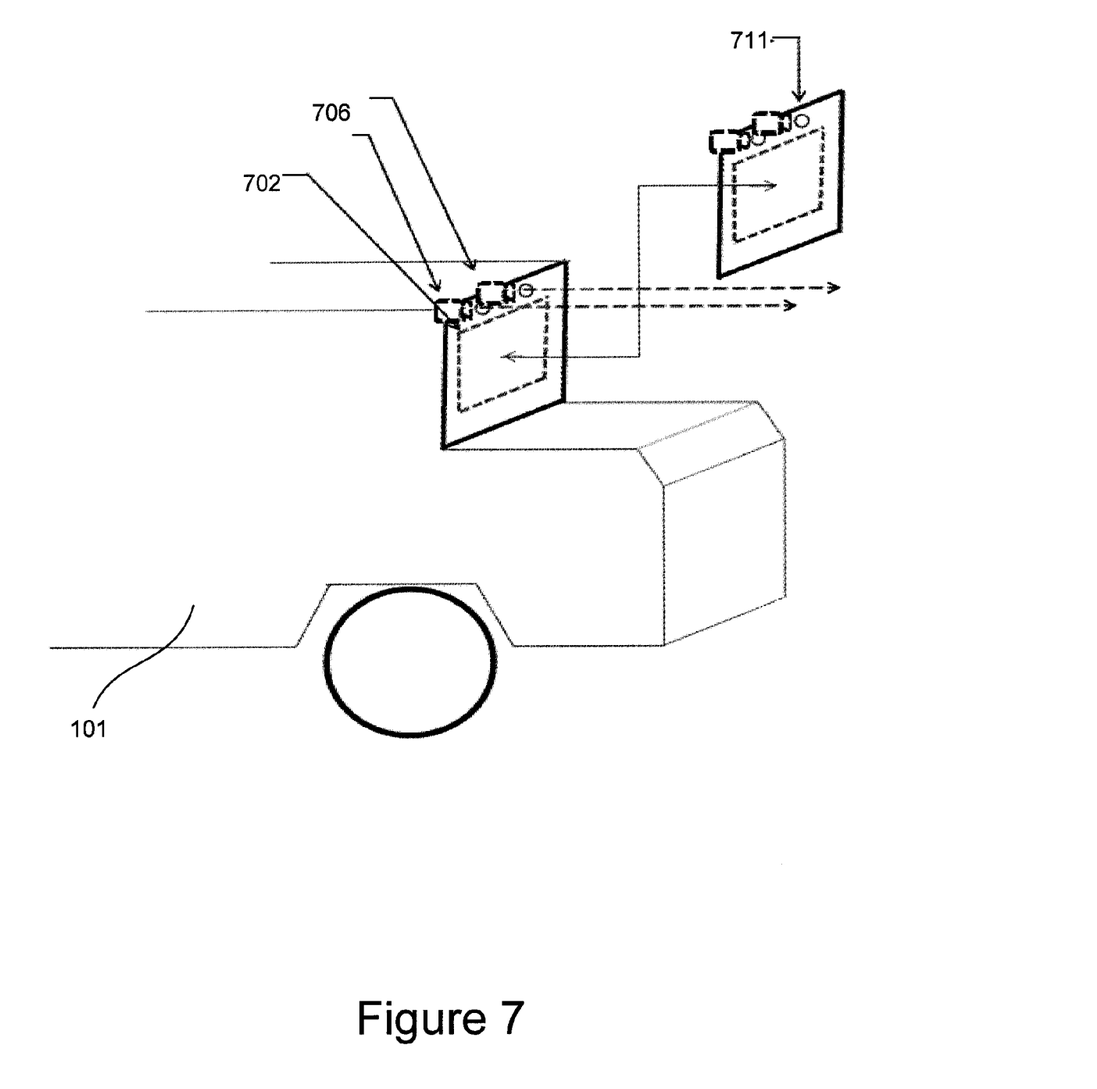
FIG. 7 depicts a module for replacing a conventional ballistic window or windshield with an armored navigation system for a vehicle.

FIG. 7 depicts an exemplary modular arrangement of a video navigation system for an armored vehicle. The exemplary embodiment depicted in FIG. 7 may include a display panel 702 and one or more cameras 706. The display panel 702 and the one or more cameras 706 may be integrally formed within an armor panel 711. This modular arrangement offers several benefits. For example, the modular arrangement allows for more efficient mass-production of the navigation system. Furthermore, the armor panel 711 may be configured to replace a conventional ballistic window and/or windshield on an existing vehicle. Because the cost of replacing an existing window on an armored vehicle is much less expensive than manufacturing a new vehicle, the modular arrangement provides for a far more cost-effective option to enable the deployment of the present navigation system in existing armored vehicles.

Figure 8:
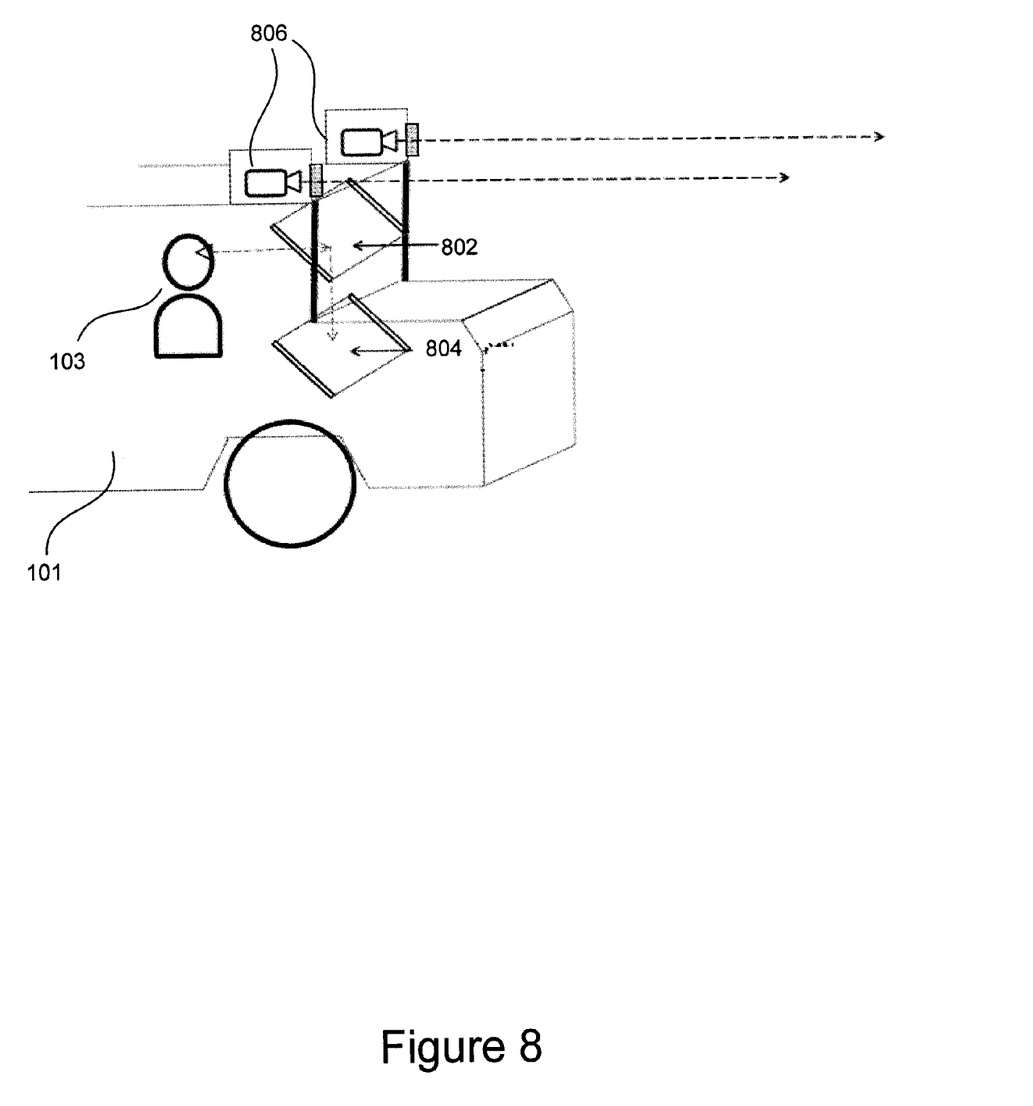
FIG. 8 depicts an exemplary navigation system for a vehicle having a video monitor within a recessed portion of the vehicle.

FIG. 8 depicts an exemplary navigation system for a vehicle having a video monitor within a recessed portion of the vehicle. According to the exemplary embodiment depicted in FIG. 8, display panel 804 may be recessed within a portion of vehicle 101. In one exemplary embodiment, display panel 804 may be recessed within a dashboard portion of vehicle 101. The one or more cameras 806 may be configured to capture images external to the vehicle and pass send them to the display panel 804. Because, in this exemplary embodiment, display panel 804 is recessed within a portion of vehicle 101, a mirror 802 may be utilized by occupant 103 to view the images on display panel 804. In the alternative, a series of mirrors (not shown) may be configured to serve the same function. In any event, the display panel 804 and mirror 802 (or series of mirrors) may be configured to electronically "mirror" the image viewed by the occupant 103 and the image displayed on the display panel 804. It should be appreciated that recessing display panel 804 within a portion of vehicle 101 provides the benefit of positioning the display panel 804 in a more protected portion of the armored vehicle. The mirror 802 may be a rugged silvered or plated metal to provide for a less fragile viewing surface within an interior portion of the vehicle 101. Still referring to FIG. 8, the one or more cameras 806 are positioned at the top of vehicle 101. It should be understood that this configuration is exemplary only and that the one or more cameras 806 may be positioned in any number of ways (e.g., as depicted in FIG. 1).

Figure 9:
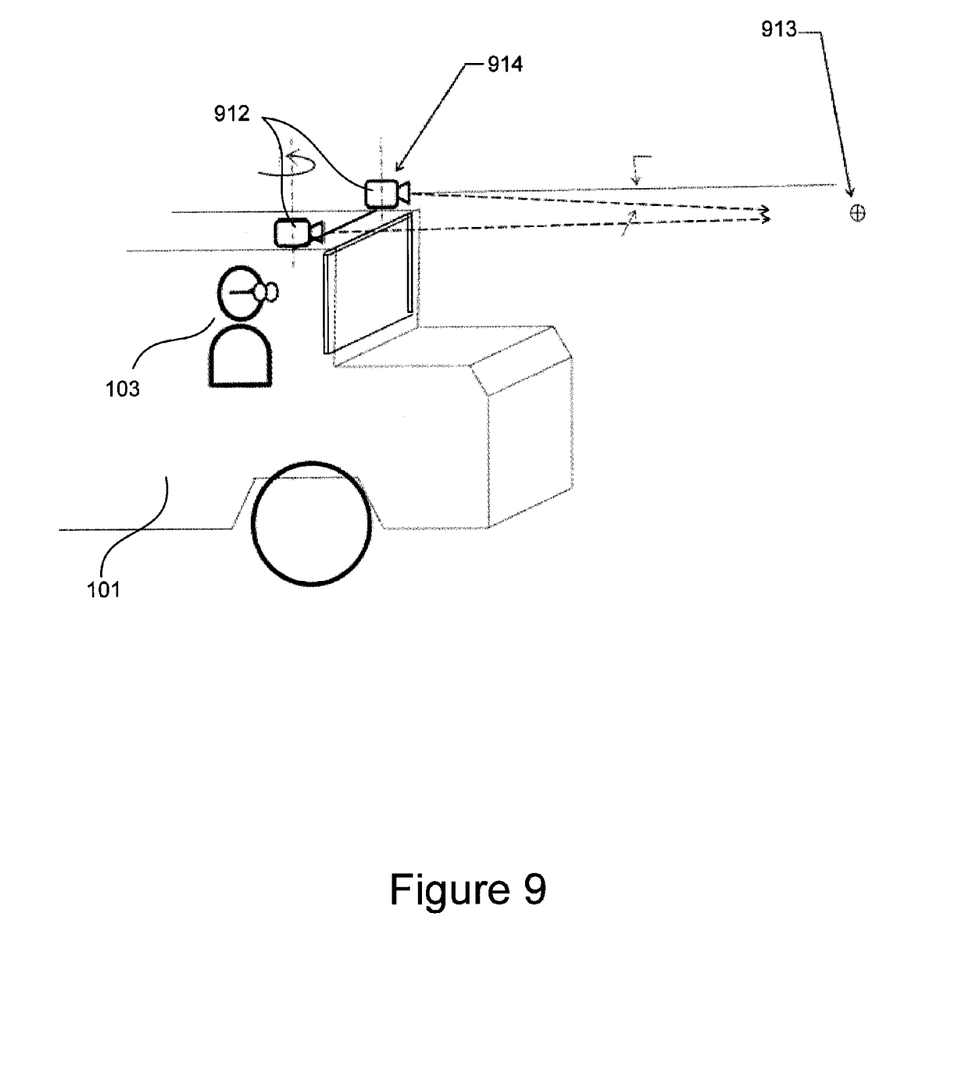
FIG. 9 depicts an exemplary navigation system for a vehicle having variable separation video cameras.

FIG. 9 depicts an exemplary navigation system for a vehicle having variable separation video cameras. In accordance with an exemplary embodiment, FIG. 9 depicts a pair of cameras 912 for capturing video images. The video images captured by each of the pair of cameras 912 may be synthesized into a stereoscopic display to provide a three-dimensional image in any number of ways (e.g., camera sync 201). Importantly, the pair of cameras 912 may be positioned on a rail or other device 914 for facilitating variable separation distance between the pair of cameras 912. In accordance with this exemplary embodiment, the distance between the pair of cameras 912 affects the stereoscopic effect of the resulting image, which in turn affects the three-dimensional image that is displayed. Therefore, the variable distance between the pair of cameras 912 is dependent upon the distance of a convergence point 913 from the vehicle 101. In an exemplary embodiment, adjustments to the angles and distance between the pair of cameras 912 may occur relative to the movement of the vehicle. For instance, when travelling at faster speeds, it may be desirable to have the pair of cameras 912 spaced further apart in order to focus on a far off convergence point 913. On the other hand, when travelling at slower speeds, it may be desirable to have the pair of cameras 912 move closer together to focus on a convergence point 913 that is closer to the vehicle. Those with skill in the art will appreciate that any number of dynamic configurations may be configured for the pair of cameras 912 based on any number of possible operating positions for a vehicle. Similarly, the angles of the pair of cameras 912 may also be configured to dynamically change based on a wide variety of configurations to suit a wide variety of possible operating conditions or user preferences.

The distance of the convergence point 913 from the vehicle 101 may be determined in any number of ways. In accordance with one exemplary embodiment, the distance of convergence point 913 may be variable based on the velocity of the vehicle 101. As discussed above, the distance of the convergence point 913 from the vehicle may be increased as the velocity of the vehicle 101 increases. In accordance with this exemplary embodiment, the variable distance between the pair of cameras 912 may be increased. On the other hand, as the velocity of the vehicle 101 decreases, the location of the convergence point 913 from the vehicle 101 may decrease. In turn, the variable distance between the pair of cameras may also be decreased. In accordance with this exemplary embodiment, it may be desirable to increase the distance of the convergence point 913 from the vehicle 101 at higher velocities because the occupant 103 may desire to view objects further away from vehicle 101 than when travelling at slower speeds. It should be appreciated that the combination and various configurations of the line of sight, toe angle, and camera distance are significant for creating various stereoscopic images. This invention should not be limited to any particular configuration and it should be appreciated that the each of the line of sight, toe angle, and camera distance may be dynamically modified depending upon the operating condition of the vehicle or preference of a user.

Still referring to FIG. 9, in accordance with another exemplary embodiment, the distance of the convergence point 913 (and in turn the variable distance between the pair of cameras 912) may be determined based upon the gaze of the occupant 103. The inside of the vehicle 101 may comprise one or more sensors (not shown) for analyzing the movement of the eyes of the occupant 103. Such sensors (not shown) may detect movement of the eye, movement of the head, and/or pupil dilation changes to analyze and determine the gaze of the occupant 103. The sensors (not shown) may be configured to send a signal to the pair of variable cameras 912 to adjust their position and desired convergence point 913. The video images captured by the pair of variable cameras 912 is then processed by the navigation system 100 for display on one or more display panels, such as display panel 102, which is described above with regard to FIG. 1. The sensors (now shown) may be positioned appropriately throughout the interior of the vehicle 101. In another exemplary embodiment, the sensors may be embedded within glasses or goggles to be worn by the occupant 103. Those with skill in the art will readily understand that the configuration of the sensors may be modified in any number of ways.

In other embodiments of the present disclosure, the navigation features may be integrated in armored, combat vehicles. The features may be combined with other management systems or electronic technologies to increase a crew's situational awareness of its surroundings. For example, the navigation features may incorporate global positioning system ("GPS") technology. This GPS technology may, by way of example only, be superimposed on a 3D anaglyph image displayed within the vehicle to its occupants. The GPS technology may further assistant with the navigation of a vehicle by indicating where threatening situations may be present, for example. Cueing technology may also be incorporated into the navigation features where a vehicle occupant may be able to detect threats using acoustic or infrared detector signals. These and other technologies may be incorporated with the navigation features to enhance the threat-level protection features of a vehicle. In addition, the navigation features of the present embodiments may be linked to other systems external to the vehicle to transmit the same images seen to the vehicle's occupants. For example, in the case of an armored combat vehicle, the displayed imaged may be simultaneously sent to a commander's position so that it too receives the same information and/or displays.

It should be appreciated that the foregoing embodiments are not intended to be limited solely to armored, combat, vehicles. The navigation system described herein can be configured for use in many other applications. By way of non-limiting example, the navigation system described herein can be used in conventional vehicles, vehicles used in mining and agriculture, as well as in plains and sea-based vehicles.

It will be readily understood by those persons skilled in the art that embodiments of the present inventions are susceptible to broad utility and application. Many embodiments and adaptations of the present inventions, other than those herein described, as well as many variations, modifications and equivalent arrangements, will be apparent from or reasonably suggested by the present invention and foregoing descriptions thereof, without departing from the substance or scope of the invention.

Accordingly, it is to be understood that this disclosure is only illustrative and exemplary and is made to provide an enabling disclosure. Accordingly, the foregoing disclosure is not intended to be construed to limit the present invention or otherwise to exclude any other such embodiments, adaptations, variations, modifications or equivalent arrangements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combinations. It is therefore intended that the appended claims cover all such changes and modifications that are within the scope of the claimed subject matter.

The invention claimed is:

1. A navigation system for a vehicle, comprising:
   one or more pairs of video cameras, each pair having a first camera with a first sight-line and a second camera with a second sight-line oriented at a variable angle relative to the first sight-line, the second camera being paced apart from the first camera by a selectively variable separation distance, and each pair being configured to capture a stereoscopic view external to the vehicle;
   a control mechanism for adjusting the first and second sight-lines of the one or more pairs of video cameras; and
   a display panel positioned within the vehicle for displaying the views captured by the one or more pairs of video cameras,
   wherein the control mechanism is configured to determine a desired convergence point and to adjust, for each pair of cameras, at least one of the set consisting of the first and second sight lines and the separation distance so that the first and second sight-lines intersect at the desired convergence point.

2. The navigation system of claim 1, wherein the display panel is configured to display three-dimensional images.

3. The navigation system of claim 1, wherein the control mechanism comprises:
one or more sensors for determining the direction of a vehicle occupant's gaze.

4. The navigation system of claim 3, wherein the control mechanism adjusts the first and second sight-lines of the one or more pairs of cameras using the determined direction of the occupant's gaze.

5. The navigation system of claim 3, wherein at least one of the one or more sensors is integrated into a helmet.

6. The navigation system of claim 3, wherein at east one of the one or more sensors is integrated into eyeglasses.

7. The navigation system of claim 3, wherein the one or more sensors are configured to analyze the vehicle occupant's eyes to determine the direction of the occupant's gaze.

8. The navigation system of claim 1, wherein the control mechanism is a joystick.

9. The navigation system of claim 1, further comprising:
a power supply;
a camera sync module;
a video display adapter, for sending video captured by the one or more cameras to the display panel.

10. The navigation system of claim 9, wherein the video display adapter is a LCD-sync module or LCD shutter glasses system.

11. The navigation system of claim 1, wherein the video cameras are articulating cameras mounted outside of the vehicle.

12. The navigation system of claim 1, wherein the video cameras each comprise optical or software zoom capabilities.

13. The navigation system of claim 1, wherein the display panel comprises a plurality of panels.

14. The navigation system of claim 1, wherein the display panel comprises a curved panel.

15. The navigation system of claim 1, wherein the display panel comprises a three-dimensional display.

16. The navigation system of claim 15, wherein the three-dimensional display is configured to display three-dimensional images to the user without the use of glasses.

17. The navigation system of claim 1, wherein the display panel is configured to display holographic images.

18. The navigation system of claim 1, wherein the one or more video cameras and the display panel are integrated into an armor panel.

19. The navigation system of claim 18, wherein the armor panel is configured to replace an existing window or windshield.

20. The navigation system of claim 1, wherein the display panel is recessed within a portion of the vehicle.

21. The navigation system of claim 1, wherein the control mechanism is configured to determine the desired convergence point from at least one of the set consisting of a direction of a vehicle occupant's gaze and a vehicle.

22. The navigation system of claim 1, wherein the control mechanism is configured to determine the desired convergence point using a direction of a vehicle occupant's gaze and a velocity of the vehicle.

23. The navigation system of claim 1, wherein the one or more pairs of video cameras is a plurality of pairs of video cameras.

24. A method for providing video navigation for a vehicle, comprising:
receiving a user-input to articulate one or more pairs of video cameras, each pair having a first camera with a first sight-line and a second camera with a second sight-line oriented at a variable angle relative to the first sight-line, the second camera being spaced apart from the first camera by a selectively variable separation distance;
determining a desired convergence point for each pair of the one or more pairs of video cameras;
adjusting, for each pair of video cameras, at least one of the set consisting of the first and second sight lines and the separation distance so that the first and second sight-lines intersect at the desired convergence point;
capturing stereoscopic video images from the one or more pairs of video cameras; and
displaying the video images on a display panel internal to the vehicle.

25. The method of claim 24, wherein the display panel is configured to display three-dimensional images.

26. The method of claim 24 further comprising:
determining a gaze direction of a vehicle occupant.

27. The method of claim 26 wherein the action of determining a desired convergence is accomplished using the determined gaze direction.

28. The method of claim 26 wherein the action of determining a desired convergence point is accomplished using the determined gaze direction and a velocity of the vehicle.

29. The method of claim 24, wherein the display panel is a pair of LCD glasses configured to be worn by an occupant.

30. The method of claim 24, wherein the display panel is a visor configured to display three-dimensional images to an occupant.

* * * * *

UNITED STATES PATENT AND TRADEMARK OFFICE
CERTIFICATE OF CORRECTION

PATENT NO. : 8,576,286 B1
APPLICATION NO. : 13/085233
DATED : November 5, 2013
INVENTOR(S) : John Childs Page 1 of 1

It is certified that error appears in the above-identified patent and that said Letters Patent is hereby corrected as shown below:

In the Claims

Claim 21, column 12, line 6, after "occupant's gaze and a" insert --velocity of the--

Claim 27, column 12, line 37, after "desired convergence" insert --point--

Signed and Sealed this
Eleventh Day of March, 2014

Michelle K. Lee
*Deputy Director of the United States Patent and Trademark Office*